United States Patent [19]

Mizobuchi

[11] Patent Number: 6,051,060
[45] Date of Patent: Apr. 18, 2000

[54] METHOD OF MAKING PIGMENT WITH INCREASED HYDROPHILIC PROPERTIES

[75] Inventor: Yoshikazu Mizobuchi, Mundelein, Ill.

[73] Assignee: Marconi Data Systems, Inc., Wood Dale, Ill.

[21] Appl. No.: 08/985,103

[22] Filed: Dec. 4, 1997

[51] Int. Cl.[7] .................................................. C08K 5/00
[52] U.S. Cl. ......................... 106/499; 428/402; 428/403; 428/407; 523/200; 523/202; 523/205; 523/206; 523/210; 106/400; 106/401; 106/402; 106/408; 106/413; 106/414; 106/417; 106/418; 106/423; 106/429; 106/433; 106/445; 106/447; 106/460; 106/465; 106/471; 106/476; 106/487; 106/491; 106/493; 106/501
[58] Field of Search ..................................... 428/402, 403, 428/407; 106/402, 400, 401, 408, 413, 414, 418, 417, 423, 429, 433, 445, 447, 460, 465, 471, 476, 487, 491, 493, 499, 501; 523/200, 202, 205, 206, 210

[56] References Cited

U.S. PATENT DOCUMENTS

| | | | |
|---|---|---|---|
| 3,330,693 | 7/1967 | Rumberger | 428/483 |
| 3,627,682 | 12/1971 | Hall et al. | 252/62.54 |
| 3,826,670 | 7/1974 | Rees | 523/204 |
| 3,883,458 | 5/1975 | Mueller et al. | 106/169.35 |
| 3,904,562 | 9/1975 | Hopfenberg et al. | 523/200 |
| 4,049,871 | 9/1977 | Ogawa et al. | 428/425 |
| 4,082,558 | 4/1978 | Nobuo | 106/10 |
| 4,349,389 | 9/1982 | Schofield | 523/200 |
| 4,404,253 | 9/1983 | Kohler et al. | 428/327 |
| 4,420,540 | 12/1983 | Ogawa et al. | 428/457 |
| 4,511,629 | 4/1985 | Konno et al. | 428/522 |
| 4,535,049 | 8/1985 | Honda et al. | 428/323 |
| 4,696,859 | 9/1987 | Miyoshi et al. | 428/64 |
| 4,699,817 | 10/1987 | Fujiki et al. | 428/403 |
| 4,713,293 | 12/1987 | Asano et al. | 428/403 |
| 4,766,051 | 8/1988 | Breton et al. | 430/138 |
| 4,844,991 | 7/1989 | Miura et al. | 428/694 |
| 4,919,922 | 4/1990 | Miyoshi et al. | 424/63 |
| 4,935,456 | 6/1990 | Huang et al. | 523/201 |
| 5,013,602 | 5/1991 | Yamazaki et al. | 428/323 |
| 5,032,428 | 7/1991 | Ogawa et al. | 427/130 |
| 5,045,428 | 9/1991 | Sacripante et al. | 430/138 |
| 5,080,986 | 1/1992 | Kmiecik-Lawrynowicz et al. | 430/39 |
| 5,167,704 | 12/1992 | Brower | 106/31.66 |
| 5,665,429 | 9/1997 | Elwakil | 427/218 |
| 5,837,045 | 11/1998 | Johnson et al. | 106/460 |
| 5,865,885 | 2/1999 | Kwan | 106/460 |

FOREIGN PATENT DOCUMENTS

| | | |
|---|---|---|
| 145359 | 6/1966 | New Zealand. |
| 213047 | 8/1985 | New Zealand. |
| 219110 | 1/1987 | New Zealand. |
| 950443 | 2/1964 | United Kingdom. |
| 1156653 | 7/1969 | United Kingdom. |
| 247717 | 5/1993 | United Kingdom. |

OTHER PUBLICATIONS

Derwent World Patents Index No. 93–081469, "Adjustment of magnetic coating material f superior recording medium production . . . ," Fuji Photo Film Co. Ltd., JP 5028480–A, Feb. 5, 1993.

Derwent World Patents Index No. 92–105863, "Aqueous ferro–fluid, using for magnetic imaging, etc . . . ," Minnesota Mining & Mfg. Co., DE 4130268–A, Mar. 26, 1992.

Derwent World Patents Index No. 90–287192, "Carbon black useful in cars tyres . . . , " Idemitsu Kosan Co. Ltd., JP 2202958–A, Aug. 13, 1990.

Derwent World Patents Index No. 90–055431, "Carbon copy paper . . . ," Kanzaki Paper Mfg. Co. Ltd., JP 2009677–A, Jan. 12, 1990.

Derwent World Patents Index No. 90–003021, "Carbon black surface–treated with polymer . . . ," Nippon Shokubai Kagaku Kogyo Co. Ltd., JP 1284564–A, Nov. 15, 1989.

Derwent World Patents Index No. 89–304469, "Manufacturing of capsule toner . . . ," Canon KK, JP 1224775–A, Sep. 7, 1989.

Derwent World Patents Index No.88–303927, "Developer for electrophotography . . . , " Rico KK, JP 63223757–A, Sep. 19, 1988.

Derwent World Patents Index No. 82–66639E, "Dyeing–pigment composition containing filler . . . ," Dainichiseika Color & Chem Mfg., Jun. 30, 1982.

American Ink Maker, Pp. 21–40, Aspects of Pigment Processing, Jun. 1997, Walter Kurtz, BASF Corp.

*Primary Examiner*—David Brunsman
*Attorney, Agent, or Firm*—Leydig, Voit & Mayer, Ltd.

[57] ABSTRACT

A method for making coated pigment particles by forming a suspension of the desired pigment particles in a medium that also comprises a polymer characterized by having hydrophobic moieties on the polymer backbone and ionic moieties that are present on, or can be formed on a polymer side chain or at the polymer terminals; allowing the suspension of pigment particles to contact said polymer at a temperature above the softening point of the polymer, allowing the resultant suspension to cool to a temperature below the solidification temperature for the polymer while maintaining the pigment particles in suspension, and, if required, forming the ionic moieties.

20 Claims, No Drawings

METHOD OF MAKING PIGMENT WITH INCREASED HYDROPHILIC PROPERTIES

FIELD OF THE INVENTION

This invention relates generally to the field of pigments, and in particular to pigment particles that have been modified to increase their hydrophilic properties. The modified pigments are useful in various formulations, such as inks, paints, coatings and the like.

BACKGROUND OF THE INVENTION

Although there theoretically are many ways to improve the hydrophilic properties (hydrophilicity) of a pigment, many require either expensive components or expensive equipment to achieve the desired goal. Often, the use of a high power grinding process is still required to make the pigment particle size small enough.

Accordingly, a need exists for pigments with good hydrophilic properties and that have one or more of the following properties: (1) exhibit a small particle size distribution, (2) have good dispersibility in highly polar solvents, such as water, (3) require little or no grinding energy, (4) have good chemical resistance and good color strength, and (5) can be manufactured in an environmentally safe manner. A method to make such pigments is required.

It has been suggested that one means of increasing the hydrophilic properties of pigments would be to introduce ionic moieties on the surface of the pigment particles, as by coating the surface of the pigment with an ionomer. The means to accomplish such a modification, to date, however has been elusive, with complex, expensive approaches being used. A specific need, therefore, has existed for a means to modify pigment surfaces with an ionomer effectively, while using an environmentally safe and simple process.

SUMMARY OF THE INVENTION

In accordance with the present invention coated pigment particles may be obtained that exhibit increases hydrophilicity.

In accordance with the present invention, the desired pigment particles are first suspended in water and then coated while in suspension, with a polymer that is at or above the softening point for that polymer. Coating of the pigment particles is achieved by allowing the suspension to cool to a temperature below the solidification temperature for the polymer while maintaining the pigment particles in suspension. The polymer must have both a hydrophobic region and a hydrophilic region that is present as a result of ionic moieties (ionomer). The ionic moieties may be either present initially or introduced after the coating of the polymer on the surface of the pigment and may be on a polymer side chain, at the polymer terminals, or on the polymer backbone. The polymer should be in the solid state at room temperature, about 25° C. and should have a melting point or drop point based on ASTM D-3954 in the range of about 50° to about 110° C.

Optionally, the pigments may be first surface coated with a hydrophobic polymer prior to coating with the polymer having ionic moieties. This provides a uniform particle surface to which the ionic polymer may be applied.

Pigments, in any form, such as in a slurry or presscake, or dry, can be used in the present invention. The coated pigments that result from the present invention require little or no grinding energy to be finely powdered. The coated pigments disperse well in highly polar solvents, such a water. The coated pigments are available in various forms, such as dry pigments, presscakes and the like.

DESCRIPTION OF THE PREFERRED EMBODIMENTS PIGMENTS

Pigments useful in the practice of the present invention include organic pigments, inorganic pigments such as titanium dioxide, as well as carbon black.

The pigments that are of use in the present invention include but are not limited to the following pigments:

Metallized Azo Reds: Red 49:1 (barium salt), Red 49:2 (calcium salt), Red 63:1 (calcium salt)
Toluidine reds
Naphthol reds
Pyrazolones
Rhodamines
Quinacridones: Red B, Red Y, Magenta B, Magenta and violet
Phthalocyanine blues, including copper phthalocyanine blue
Alkali Blue
Phthalocyanine greens
Carbazole violets
Monoarylide Yellow
Diarylide Yellow
Red Lake C
Lithol reds: calcium and barium salts
Lithol rubine
Bon Maroon
Perylene pigments
Red 2B: calcium, barium and magnesium salts
Chrome Yellow
Chrome Orange
Molybdate orange
Orange 36, Diarylide orange, Dianisidine
orange, tolyl orange and Dinitraniline orange The pigments used in accordance with the present invention may have a wide range of particle sizes, as from about 0.02 μm to about 100 μm, preferably from about 0.04 μm to about 5 μm, and more preferably from about 0.05 to about 2 μm.

POLYMER COATING

Useful polymers include hydrophilic copolymers of ethylene and acrylic acid in salt form, such as ACLYN 201 A, ACLYN 262 A, ACLYN 276 A, ACLYN 285 A and ACLYN 295 A. When the ionic moieties are formed after coating, a copolymer in non-salt form, such as copolymers of ethylene and acrylic acid, may be used and then the salt formed. Such polymers in non-salt form include AC5180, AC5120, AC580, AC540 and AC540A, all from Allied Signal.

Typically, the melting point, or drop point based on ASTM D-3954, of the polymer will be in the range of about 50° to about 110° C. The counter-cation should be an alkali metal or alkaline earth metal cation. Multivalent metal cations generate cross-linkage between polymer chains. Usually the cations will be $Na^+$ or $Ca^{++}$. The acid number of the coating materials should be in the range of about 0 to about 200. Most preferably, the polymer will have an acid value from about 40 to about 180.

It is believed that low molecular weight polymers are preferable in most instances. If the chain length of the polymer is too long, it is possible that the dispersing polymer will interact physically with more than one particle, thus causing undesired agglomeration of the particles. Accordingly, for example, the molecular weight may range from about 100 to about 50,000, usually up to about 10,000, typically up to about 5,000, and more typically up to about 2,500. The molecular weight used can vary, of course, depending upon the particular components used in the formulation.

When a double coating layer is desired, the polymer that is used to coat the polymer surface is a hydrophobic polymer. Useful hydrophobic polymers include oxidized polyethylene. Such hydrophobic polymers should meet the same melting point or drop point temperature ranges as for the hydrophilic polymers discussed above and should also be in molecular weight ranges specified for the hydrophilic polymers above.

The present invention thus provides pigment particles selected from the group consisting of organic pigments, inorganic pigments, and carbon black, surface coated with a sufficient amount of an ionomer to increase the hydrophilic properties of the pigment particles.

In general, the ionic polymer coating will be present in an amount from about 1 to about 10 percent, more typically from about 2 to about 8 percent, most typically about 5 percent, by weight, based on the weight of the pigment particle.

The pigment particles of the present invention may also have a first surface coating layer of a hydrophobic polymer over which the ionomer is applied in an amount sufficient to increase the hydrophilic properties of the pigment particle.

If a double layer coating is used, typically, the hydrophobic layer will be used in an amount from about 1 to about 10 percent, by weight, more typically in an amount from about 2 to about 8 percent, most typically about 5 percent by weight based on the weight of the pigment particles. Similarly, the amount of ionic polymer added on the pigment will be from about 1 to about 10 percent, more typically from about 2 to about 8 percent, most typically about 5 percent, by weight based on the weight of the pigment particle.

METHOD OF APPLYING COATING

Preferably, a suspension of pigment particles is first made starting with dry pigments, a pigment slurry or a presscake. The pigment particles are dispersed in water using high shear mixing to form a suspension. Usually from about 1 to about 20 percent by weight of the suspension is pigment and the balance is water. More typically from about 5 to about 20 percent of the suspension is pigment. After forming the pigment suspension, heat is applied to raise the temperature to a level above the melting point or drop point of the polymer that is to be used to coat the pigment particles. Generally, the temperature will be from about 50° C. to about 100° C., typically above 60° C.

After the aqueous pigment suspension is brought to the desired temperature, with continued mixing, the surface coating agent(s) are added and mixing is continued. The suspension is maintained at a temperature above the softening point, which is about 10° C. below the melting point or drop point of the coating agent(s) for a time sufficient to allow the coating agents to become uniformly distributed throughout the suspension. Generally, mixing will continue for about 10 to about 60 minutes, usually, for about 20 to about 30 minutes.

Subsequently, the heated suspension is allowed to cool to a temperature below the softening point, which is about 10° C. below the melting point or drop point for the coating agents. Generally, the suspension is allowed to cool to about room temperature, about 25° C. to about 30° C., while maintaining mixing. This cooling allows the polymer coating to be formed on the surface of the pigment particles.

If the coating agent is a polymer with ionizable moieties, as opposed to already having present ionic moieties, the ionizable moieties of the coated pigment particles may then be ionized by any suitable means. Usually, a suspension of coated particles will be formed and a basic source of metal ions introduced, such as sodium hydroxide. Sufficient base is added to adjust the pH of the suspension to from about 8 to about 12, usually about 10.

AREA OF APPLICATION

The present invention is useful for making coated pigment particles that may find use in a wide variety of applications, such as ink for ink jet (continuous and drop-on-demand systems), phase change type ink (solid ink for ink jet), aqueous based ink, presscake for inks, aqueous based paint, and the like.

EXAMPLES

The present invention is further illustrated by the following non-limiting examples.

PROCESS EQUIPMENT

In the examples that follow, the equipment utilized to perform the examples was as follows, unless otherwise indicated.

A 1.2 L stainless steel container equipped with a disperser from Premier Mill Corp., Laboratory Dispersator, Series 2000, Model 90 (one horse power with a 2.5 inch blades) and a hot plate was used.

PARTICLE SIZE DISTRIBUTION ANALYSIS

A laser beam scattering particle size analyzer from HORIBA, Model LA-900, was used for the particle size distribution study on the surface treated pigments (in presscake form) which were redispersed in solvent(s). Ethanol was chosen as the solvent for the particle size analysis in the analyzer. A relative refractive index for the measurements was set at 1.41 for all evaluated pigments (refractive index of carbon black: 1.92 refractive index of ethanol: 1.36) because of difficulty in getting the refractive index for the pigments. A sonication process was applied for the pigment dispersed in ethanol for 2 minutes after the pigment was set in the analyzer. Then the particle size distribution of the pigment was evaluated.

PIGMENTS FOR SURFACE TREATMENT

Three presscakes, Copper Phthalocyanine Blue GIS (BL2101-PC), Lithol Rubine (LR5133-PC) and Diarylid Yellow (YA1933-PC) from Magruder Color Co. Inc., were used, as indicated in the examples. A presscake, Alkali Blue (NB D6152), from BASF, was also used as indicated in the examples.

Carbon Black, Panther 17V in dry form from Engineered Carbons and AJACK BLACK 5021, which was pre-ground carbon black slurry in water, from Dispersion Solution Inc. were also used as indicated in the examples.

SURFACE COATING AGENTS AND SOLVENTS

All surface coating agents are from Allied Signal and the sodium hydroxide was from Aldrich Chemical Company.

Table 1 shows physical and chemical characteristics of the coating materials.

TABLE 1

Physical and Chemical Characteristics of Coating Materials

| Trade Name | Melting Point (° C.) | Salt Form | Acid # | Chem. Component |
|---|---|---|---|---|
| ACLYN 201 A | 102 | Ca | 42 | Partially ionized copolymer of ethylene and acrylic acid |
| ACLYN 262 A | 112 | Na | 75 | Partially ionized copolymer of ethylene and acrylic acid |
| ACLYN 276 A | 108 | Na | 40 | Partially ionized copolymer of ethylene and acrylic acid |
| ACLYN 285 A | 82 | Na | 120 | Partially ionized copolymer of ethylene and acrylic acid |
| ACLYN 295 A | 99 | Zn | 0 | Partially ionized copolymer of ethylene and acrylic acid |
| AC 5180 | 76* | — | 180 | Copolymer of ethylene and acrylic acid |
| AC 6702 | 88* | — | 15 | Oxidized polyethylene |

*Drop Point (based on ASTM D-3954).

SURFACE COATING PROCEDURES 500 grams of slurry, which contains 10 weight percent pigment for Copper Phthalocyanine Blue and carbon black, and 5 weight percent pigment for the others, was reconstituted from a presscake, a dry powder or a concentrated slurry with water in the container. The slurry was mixed well with the disperser at approximately 1000 rpm for 20 minutes. The slurry then was heated up to above 60° C., with stirring at the same speed. After the surface coating agent(s) was added in the slurry with high speed mixing at 3000 rpm; the process was maintained for 20 to 30 minutes. Then the hot plate was removed from the coating set and the mixture was cooled off by air with mixing at 2000 rpm until the temperature reached a range between 25° C. and 35° C.

PREPARATION OF PIGMENT DISPERSION

An approximate 1 weight percent pigment dispersion was prepared in a 20 ml glass vial. The dispersion was sonicated for 20 minutes. Solvents used for the pigment dispersions were water, ethanol and methylethylketone (MEK). An acid fountain solution (pH: 4.64) and an alkaline aqueous solution (pH: 11) were also chosen for this preparation.

PREPARATION OF PRESSCAKE

The slurry including the surface treated pigment was filtered through a filter paper, and pH and conductivity of the filtrate were evaluated. The residue on the filter paper formed the presscake.

pH ADJUSTMENT OF TREATED PIGMENT pH adjustment was carried out by the following procedure:

(1) A presscake consisting of surface treated pigment and water, about 50 grams, was redispersed in water in a ratio of ⅕ (presscake/water) by weight.

(2) Sodium hydroxide (5 weight percent) aqueous solution was dropped in the slurry with stirring and its pH was checked by using a pH paper.

(3) When the pH value reached around 10, the addition of the sodium hydroxide aqueous solution was stopped. After filtration of the slurry and additional washing with deionized water (100 ml, twice), pH and conductivity of the filtrates were measured by using a pH meter.

TESTING PROCEDURE OF STABILITY OF PIGMENT DISPERSION

Approximately 1 weight percent of pigment (in dry weight) in presscake form except the pigment as control supplied in dry form, was dispersed in a solvent placed in a 20 ml glass vial. The carbon black, Panther 17V in dry form and AJACK BLACK 5021 in presscake form after filtration of the slurry were used as controls for this test. It was sonicated for 10 minutes. Solvents for the test were water, ethanol (EtOH), and methyl ethyl ketone (MEK).

After preparation, as described above, the dispersions were kept still on an experimental bench for 24 hours and the stability of the pigment dispersions was evaluated by observing the amount of settled pigment and the color of the supernatants. The dispersions were classified by four degrees of stability, as shown in Table 2.

TABLE 2

Explanation of Degree of Pigment Dispersion Stability

| Degree of Stability | Explanation |
|---|---|
| E | Suspended very well with no settling |
| G | Suspended well with a little settling |
| P | Poorly suspended with a large settling |
| VP | Totally settled |

EVALUATION OF PIGMENT IN WATER BASED INK

The coated pigment in presscake form was mixed with a water based varnish, AP-4050, from Lawter International, Inc. in a 4 oz. glass jar with 50 grams of stainless steel balls (2 mm diameter) by using a paint mixer from Red Devil Equipment Co. Type 5400, Model OM, at a ratio of 2/48 (pigment in dry weight/varnish including water from presscake), by weight, to make a coating material for approximately 30 minutes at room temperature.

The coating material was applied on a coated stock paper by using a #8 Meyer bar. After at least 24 hours from the coating, the color quality, such a L, a and b values, of the sample was measured by using a spectrophotometer from Hunter Lab, Model 45/0 Color Quest. All data were the average of five measurements at five different portions of the sample.

Examples 1–5

Evaluation of Ionomers for Surface Modification of Cooper Phthalocyanine Blue

The five ionomers described in Table 1 were applied on copper phthalocyanine blue pigment surface individually to evaluate their modification efficiency as shown by the stability of the dispersed pigment in highly polar solvents. The results are shown in Table 3. The amount of the coating material for the pigment is varied by its character.

TABLE 3

Stability of Dispersed Copper Phthalocyanine Blue Pigment in Polar Solvent

Evaluation of Coating Material

| Example No. | Coating Material (Melting Pt./Ion/Acid No.) | Weight % of Coating Material | Water | Ethanol | MEK |
|---|---|---|---|---|---|
| 1 | ACLYN 276 A (108°/Na/40) | 10 | E | VP | VP |
| 2 | ACLYN 262A (112°/Na/75) | 5 | E | VP | VP |
| 3 | ACLYN 285A (82°/Na/120) | 5 | E | E | VP |
| 4 | ACLYN 201 (102°/Ca/42) | 10 | P | VP | VP |
| 5 | ACLYN 295A (99°/Zn/0) | 5 | VP | VP | VP |
| — | — | — | VP | VP | VP |

The ionomers in sodium salt form with high acid number showed higher efficiency in improving the hydrophilic character on the surface of the copper phthalocyanine blue pigment, which inherently is hydrophobic. Furthermore, the ionomer with the lowest melting point and the highest acid number of the three ionomer in the sodium salt form showed the highest efficiency in imparting hydrophilic property. The key factors in selecting ionomers for use in the present invention include their melting point (about 70° C. to 110° C.), salt form (preferably, sodium salt) and acid number (about 40 to about 180).

Examples 6–9

Evaluation of Quantity of Ionomer (ACLYN 285A) Coating Copper Phthalocyanine Blue Pigment The ionomer, ACLYN 285A, was chosen for this test because it produced the best results as shown in Table 3. The weight percent of the material in the coated dry pigment was varied from zero to fifteen percent to estimate an optimum range for the modification. The results are shown in Table 4.

TABLE 4

Evaluation of Stability of Dispersed Copper Phthalocyanine Blue Pigment in Polar Solvent Evaluation of Quantity of ACLYN 285A

| Example No. | Weight % of ACLYN 285A | Water | Ethanol | MEK |
|---|---|---|---|---|
| — | 0 | VP | VP | VP |
| 6 | 3 | P | VP | VP |
| 7 | 5 | E | E | VP |
| 8 | 10 | E | E | VP |
| 9 | 15 | E | E | VP |

The conversion of pigment property from being hydrophobic to being hydrophilic was evident at about 3 weight percent loading of the coating material on the pigment surface. The particle size distribution of each of the samples was evaluated to determine the actual optimum range for loading ACLYN 285A on the pigment surface. Those results are shown in Table 5.

TABLE 5

Particle Size Distribution of ACLYN 285A Treated Copper Phthalocyanine Blue

Loading Quantity Dependency

| Example No. | Weight % of ACLYN 285A | Median Diameter (micrometer) | Standard Deviation (micrometer) |
|---|---|---|---|
| — | 0 | 0.147 | 0.260 |
| 6 | 3 | 0.424 | 0.794 |
| 7 | 5 | 0.109 | 0.086 |
| 8 | 10 | 0.537 | 0.872 |
| 9 | 15 | 1.324 | 0.678 |

The optimum loading was about 5 weight percent on the dry surface-coated pigment. The efficiency of the hydrophilic conversion is less below that loading and the particle size distribution is poorer above that loading.

Examples 10–12

Evaluation of Quantity of ACLYN 285A Coating on Lithol Rubine Pigment

The same approach as used in the previous examples was applied for modifying the surface of lithol rubine pigment, which has a highly hydrophilic character. Table 6 shows the loading quantity relationship to the stability of the dispersed pigment in highly polar organic solvents and water.

TABLE 6

Evaluation of Stability of Dispersed Lithol Rubine Pigment in Polar Solvent

Evaluation of Quantity of ACLYN 285A

| Example No. | Weight % of ACLYN 285A | Water | Ethanol | MEK |
|---|---|---|---|---|
| — | 0 | VP | VP | VP |
| 10 | 5 | E | VP | VP |
| 11 | 10 | E | VP | VP |
| 12 | 15 | E | VP | VP |

From Table 6 it is evident that it is possible to modify the lithol rubine surface to render it stable in water, with a loading of ACLYN 285A at or above 5 weight percent based on the dry weight of the coated pigment. However, as shown by the results in Table 7 such a loading does not achieve a significant improvement because the coated particles still have very poor stability in ethanol. Some advantage in particle size distribution is achieved, as shown in Table 7.

TABLE 7

Particle Size Distribution of ACLYN 285A Coated Lithol Rubine Pigment

| Example No. | Weight % of ACLYN 285A | Median Diameter (micrometer) | Standard Deviation (micrometer) |
|---|---|---|---|
| — | 0 | 0.949 | 2.636 |
| 10 | 5 | 1.248 | 0.588 |

Even though the particle sizes are large, the uncoated pigment showed a wider particle size distribution in comparison to the coated particle.

Examples 13–14

Evaluation of Quantity of ACLYN 285A Coating on Diarylid Yellow Pigment

The quantity of ACLYN 285A was varied to optimize its mixing ratio with the dry pigment. The stability of the dispersed coated pigment in highly polar solvents is shown in Table 8. The uncoated yellow pigment has a hydrophilic character. The pigment is not an ionic pigment, like lithol rubine, and its hydrophilic character is between copper phthalocyanine blue and lithol rubine.

TABLE 8

Evaluation of Stability of Dispersed Diarylid Yellow Pigment in Polar Solvent

Evaluation of Quantity of ACLYN 285A

| Example No. | Weight % of ACLYN 285A | Water | Ethanol | MEK |
|---|---|---|---|---|
| — | 0 | VP | VP | VP |
| 13 | 5 | P | P | VP |
| 14 | 10 | E | E | E |

From the results shown in Table 8, it appears that the yellow pigment requires about 10 weight percent of the coating material to complete its surface modification. Table 9 shows the particle size distribution of the coated pigment in ethanol.

TABLE 9

Particle Size Distribution of ACLYN 285A Coated Diarylid Yellow Pigment

| Example No. | Weight % of ACLYN 285A | Median Diameter (micrometer) | Standard Deviation (micrometer) |
|---|---|---|---|
| — | 0 | 5.712 | 3.435 |
| 13 | 5 | 2.591 | 1.368 |
| 14 | 10 | 0.911 | 0.394 |

From the results shown in Table 9, it is clear that the surface modification of the pigment substantially reduced its particle size distribution in comparison with the non-treated pigment. The particle sizes are still high in comparison with the copper phthalocyanine blue pigment because the yellow pigment required higher loading (10 weight percent) of the ionomer.

Examples 15–16

Evaluation of Quantity of ACLYN 285A Coating on Carbon Black Pigment

The ionomer, ACLYN 285A, was applied to the surface of carbon black pigment to test the dispersibility of the coated pigment in highly polar solvents and to optimize the loading quantity of the ionomer on the pigment. The results are shown in Table 10.

TABLE 10

Evaluation of Stability of Dispersed Carbon Black Pigment in Polar Solvent

Evaluation of Quantity of ACLYN 285A

| Example No. | Carbon Black | Weight % of ACLYN 285A | Water | Ethanol | MEK |
|---|---|---|---|---|---|
| — | Panther 17 V | 0 | VP | E | VP |
| 15 | Panther 17 V | 5 | E | E | E |
| — | AJACK BLACK 5021 | 0 | P | E | E |
| 16 | AJACK BLACK 5021 | 7 | E | E | E |

The results in Table 10 show that the surfaces of the carbon black pigments were modified by the 5 to 7 weight percent loading of the coating material. The stability of the dispersed pigment in water also was substantially increased by coating its surface with the ionomer. Table 11 shows the particle size distribution of the pigments in ethanol.

TABLE 11

Particle Size Distribution of ACLYN 285A Coated Carbon Black Pigments

| Example No. | Carbon Black | Weight % of ACLYN 285A | Median Diameter (micrometer) | Standard Deviation (micrometer) |
|---|---|---|---|---|
| — | Panther 17 V | 0 | 0.202 | 0.066 |
| 15 | Panther 17 V | 5 | 0.229 | 0.126 |
| — | AJACK BLACK 5021 | 0 | 0.110 | 0.194 |
| 16 | AJACK BLACK 5021 | 7 | 0.228 | 0.105 |

From the results shown in Table 11, it appears that although the coating resulted in an increased dispersed stability of the pigment in the solvent, the particle size distribution of the coated pigment was not as good as the uncoated pigment, because of its high affinity to ethanol.

Example 17

Evaluation of Quantity of ACLYN 285A Coating on Alkali Blue Pigment

The ionomer, ACLYN 285A, was applied to the surface of alkali blue pigment to modify its surface. The pigment naturally has high affinity to ethanol. The modification increased the dispersed stability of the pigment in water and methyl ethyl ketone as shown by the results are shown in Table 12.

TABLE 12

Evaluation of Stability of Dispersed Alkali
Blue Pigment in Polar Solvent

Evaluation of Quantity of ACLYN 285A

| Example No. | Weight % of ACLYN 285A | Water | Ethanol | MEK |
|---|---|---|---|---|
| — | 0 | VP | E | VP |
| 17 | 10 | VP | E | E |

The stability of coated pigment with 10 weight percent of the ionomer in methyl ethyl ketone was substantially improved. The particle size distribution in ethanol is shown in Table 13.

TABLE 13

Particle Size Distribution of ACLYN 285A Coated
Alkali Blue Pigment

| Example No. | Weight % of ACLYN 285A | Median Diameter (micrometer) | Standard Deviation (micrometer) |
|---|---|---|---|
| — | 0 | N/A | N/A |
| 17 | 10 | N/A | N/A |

N/A: Less than 40 nm. The HORIBA Particle Size Analyzer could not detect their particle sizes.

The surface treatment did not disturb the particle size distribution of the alkali blue pigment and increased the affinity of the pigment to ethanol.

Examples 18–19

Evaluation of AC 5180 Coated Copper
Phthalocyanine Blue Pigment

A copolymer of ethylene and acrylic acid, AC 5180, was coated on the pigment to evaluate its modification capability and stabilization ability. The coated copolymer was ionized on the pigment in water by changing pH with NaOH aqueous solution to evaluate the capability for improving the dispersed stability and particle size distribution of the pigment. The results are shown in Table 14.

TABLE 14

Stability of Dispersed AC 5180 Coated Copper
Phthalocyanine Blue Pigment with Ionization
Factor

| Example No. | Weight % of AC 5180 | Ionization | pH | Water | Ethanol | MEK |
|---|---|---|---|---|---|---|
| — | 0 | No | — | VP | VP | VP |
| 18 | 7 | No | 7.13 | E | VP | VP |
| 19 | 7 | Yes | 8.28 | E | E | VP |

The copolymer, AC 5180, increased the stability of the pigment in water as compared with the non-surface treated pigment. Furthermore, the ionization improved the dispersed stability of the pigment in water and ethanol, and these results are the same as those with respect to the ionomer, ACLYN 285A-coated copper phthalocyanine blue pigment. Table 15 shows the particle size distribution in ethanol.

TABLE 15

Particle Size Distribution of AC 5180 Coated
Copper Phthalocyanine Blue Pigment and
Ionization Effect

| Example No. | Weight % of AC 5180 | Ionization | Median Diameter (micrometer) | Standard Deviation (micrometer) |
|---|---|---|---|---|
| 18 | 7 | No | 1.625 | 0.767 |
| 19 | 7 | Yes | 0.143 | 0.165 |

The post-ionization of the copolymer on the pigment improved the dispersed stability of the pigment in water and ethanol, as well as the particle size distribution. The ionization employed after the copolymer was coated on the pigment surface, resulted in a coated pigment that possessed properties essentially identical to that achieved by directly coating with an ionomer.

Examples 20–23

Evaluation of AC 5180 Coated Carbon Black
Pigment

The same approach employed for copper phthalocyanine blue pigment was used for carbon black pigments. The results are shown in Table 16.

TABLE 16

Stability of Dispersed AC 5180 Coated Carbon
Black Pigment with Ionization Factor

| Example No. | Carbon Black | Weight % of AC 5180 | Ionization | pH | Water | Ethanol |
|---|---|---|---|---|---|---|
| — | P 17 V* | 0 | No | — | VP | E |
| 20 | P 17 V* | 5 | No | 5.7 | VP | E |
| 21 | P 17 V* | 5 | Yes | 8.2 | E | E |
| — | AJACK** | 0 | No | — | P | E |
| 22 | AJACK** | 5 | No | 4.8 | E | E |
| 23 | AJACK** | 5 | Yes | 9.8 | E | E |

P 17 V*: Panther 17 V;
AJACK**: AJACK BLACK 5021

From Table 16 it is clear that the post-ionization of the copolymer on the pigment improved the dispersed stability of the pigment in the highly polar solvent water. The particle size distribution is shown in Table 17.

TABLE 17

Particle Size Distribution of AC 5180 Coated
Carbon Black Pigment

| Ex. No. | Carbon Black | Weight % of AC 5180 | Ionization | Median Diameter (micrometer) | Standard Deviation (micrometer) |
|---|---|---|---|---|---|
| 20 | P 17 V* | 5 | No | 0.229 | 0.140 |
| 21 | P 17 V* | 5 | Yes | 0.339 | 0.023 |
| 22 | AJACK** | 5 | No | 0.261 | 0.102 |
| 23 | AJACK** | 5 | Yes | 0.206 | 0.060 |

P 17 V*: Panther 17 V; AJACK**: AJACK BLACK 5021

The results in Table 17 are quite similar to those of the ionomer-coated carbon black pigments described in Table 11. However, the post-ionization of the copolymer on the pigments generated quite a narrower particle size deviation.

Examples 24–25

Evaluation of AC 5180 Coated Alkali Blue Pigment

It is well known that alkali blue pigment is chemically unstable in alkaline condition above pH 7.5 and that the pigment degrades in that environment. The same treatment and post-ionization of the copolymer on the pigments as explained in the preceding examples was applied on the alkali blue pigment to enhance its stability in water. The results are shown in Table 18.

TABLE 18

Stability of Dispersed AC 5180 Coated Alkali Blue Pigment with Ionization Factor

| Example No. | Weight % of AC 5180 | Ionization | pH | Water | Ethanol | MEK |
|---|---|---|---|---|---|---|
| — | 0 | No | 1.55 | VP | E | VP |
| 24 | 5 | No | 1.68 | VP | E | E |
| 25 | 5 | Yes | 9.01 | E | E | E |

The post-ionization increased the dispersed stability of the coated pigment in water as well as maintaining its high stability in ethanol and methyl ethyl ketone. Table 19 shows the particle size distribution in ethanol.

TABLE 19

Particle Size Distribution of AC 5180 Coated Alkali Blue Pigment and Ionization Effect

| Example No. | Weight % of AC 5180 | Ionization | Median Diameter (micrometer) | Standard Deviation (micrometer) |
|---|---|---|---|---|
| 24 | 5 | No | N/A | N/A |
| 25 | 5 | Yes | N/A | N/A |

N/A: Particle size is less than 40 nm.

The coating and post-ionization did not destroy the particle size distribution of the alkali blue pigment in ethanol.

Examples 27–28

Evaluation of Multi-Components Coated Copper Phthalocyanine Blue Pigment

Double layers are coated on the pigment surface using two different surface modifying materials, such as ACLYN 285 A and AC 6702 (oxidized polyethylene), to prove the coating efficiency as determined by the dispersed stability of the pigment in highly polar solvents and water. The double coatings were carried out by two methods: (1) sequentially the two materials, AC 6702 and ACLYN 285 A, were added in the slurry, and (2) simultaneously they were added in the slurry. The results are shown in Table 20.

TABLE 20

Evaluation of Stability of Dispersed Copper Phthalocyanine Blue Pigment Coated with Multi-Components

| Example No. | Coating Material (Weight %) | Water | Ethanol | MEK |
|---|---|---|---|---|
| 26 | AC 6702(5)/ACLYN 285 A(5)* | E | E | VP |
| 27 | AC 6702(5) + ACLYN 285 A(5)** | E | E | VP |
| 28 | AC 6702(5) | VP | VP | VP |

*Sequentially the two components were added in the slurry. 1st, AC 6702, and 2nd, ACLYN 285 A
**Simultaneously the two components were added in the slurry.

The results in Table 20 may be compared with the results in Table 14 for the uncoated pigment.

The surface was rendered hydrophilic, even though the hydrophobic component, AC 6702, was involved in the coating materials. This is evidence that the pigment was coated with the double layer. The first layer is AC 6702 and the second layer is ACLYN 285 A. Table 21 shows the particle size distribution.

TABLE 21

Particle Size Distribution of Multi-Components Coated Copper Phthalocyanine Blue Pigment

| Example No. | Coating Material (Weight %) | Median Diameter (micrometer) | Standard Deviation (micrometer) |
|---|---|---|---|
| 26 | AC 6702(5)/ACLYN 285 A(5) | 0.189 | 0.112 |
| 27 | AC 6702(5) + ACLYN 285 A(5) | 0.257 | 0.174 |
| 28 | AC 6702(5) | 1.776 | 0.847 |

Notation for the coating materials follows the explanations for Table 20.

The high loading of the coating materials, 10 weight percent, on the pigment increased its particle size distribution as compared with the 5 weight percent ACLYN 285 A coated pigment shown in Table 5. However, when this data is compared with the particle size distribution of the control, AC 6702, it is clear that the results are different, with a smaller particle size than with the 10 weight percent ACLYN 285 A coated pigment shown in Table 5.

Examples 29–31

Evaluation of Multi-Components Coated Alkali Blue Pigment

Double layers are coated using two different surface modifying materials, those used for copper phthalocyanine blue pigment, on the hydrophilic surface. The coating efficiency is evaluated based on the dispersed stability of the pigment in the solvents. All procedures are the same as used for the previous examples for copper phthalocyanine blue pigment. This method indicates a means to increase chemical strength for alkali blue pigment. The results are shown in Table 22.

TABLE 22

Evaluation of Stability of Dispersed Alkali Blue Pigment Coated with Multi-Components

| Example No. | Coating Material (Weight %) | Water | Ethanol | MEK |
|---|---|---|---|---|
| 29 | AC 6702(5)/ACLYN 285 A(5)* | VP | E | E |
| 30 | AC 6702(3) + ACLYN 285 A(2)** | VP | E | E |
| 31 | AC 6702 | VP | E | VP |

* and **See Table 20.

The foregoing results may be compared to the results in Table 12. The double-layered coating on the pigment was accomplished in water. The pigments that had multi-components of the coating materials resulted in the same dispersed stability in the polar solvents as the ionomer, ACLYN 10 weight percent, coated pigment as shown in Table 12. Table 23 shows the particle size distributions.

TABLE 23

Particle Size Distribution of Multi-Components Coated Alkali Blue Pigment

| Example No. | Coating Material (Weight %) | Median Diameter (micrometer) | Standard Deviation (micrometer) |
|---|---|---|---|
| 29 | AC 6702(5)/ACLYN 285 A(5) | N/A | N/A |
| 30 | AC 6702(3) + ACLYN 285 A(2) | N/A | N/A |
| 31 | AC 6702(5) | 0.468 | 0.693 |

Notation for the coating materials follows the explanations for Table 20.

The results in Table 23 show that the double layer coating on the pigment does not disturb its fine particle distribution. The hydrophobic component, AC 6702, is the first layer on the pigment surface and the hydrophilic coating, ACLYN 285 A, is the outer layer.

Evaluation of Chemical Resistance of Alkali Blue Pigment in Alkaline Environment This is an evaluation of the alkaline resistance of the pigment added by the coating material(s) in a water-based flexographic formula in a range of pH 8.5 and 9.0. It is known that the pigment is unstable in an aqueous environment with pH above 7.5. The degradation of the pigment causes its color darker (low L value), redder (high a value) and less blue (high b value). Table 24 shows the results of the coated samples based on the time dependency test.

TABLE 24

Stability Test on Coated Alkali Blue Pigment in Alkaline Environment

| Time after ink prepared: T | ACLYN 285 A (10 wt. %)**** | AC6702 (5 wt. %)/ACLYN 285A (5 wt. %)* | AC6702(3 wt. %) + ACLYN 295A (2 wt. %)** | No Coating Material Applied - Control*** |
|---|---|---|---|---|
| T = 1 Day | L: 18.12<br>a: 18.19<br>b: −79.67 | L: 16.01<br>a: 21.18<br>b: −68.54 | L: 15.50<br>a: 19.16<br>b: −70.25 | L: 20.89<br>a: 17.95<br>b: −87.71 |
| T = 21 Days, or T = 18 Days for Control | L: 18.46<br>a: 17.47<br>b: −80.24 | L: 15.09<br>a: 20.92<br>b: −66.55 | L: 15.41<br>a: 18.64<br>b: −70.67 | L: 18.16<br>a: 19.43<br>b: −80.53 |

* and **Examples 29 and 30 from Table 22;
***Presscake, from BASF, as Control;
****Example 17, from Table 12.

The acrylic resin coating materials produced pigments with better stability, such as no color factors change or only minor change, as compared with the control (with no coating material on its surface) in alkaline aqueous solution, pH 8.5 to 9.0. No settling of the pigment was observed for any of the inks.

What is claimed is:

1. A method for making coated pigment particles, said method comprising forming a suspension of the desired pigment particles in an aqueous medium that also comprises a polymer characterized by having hydrophobic moieties on the polymer backbone and ionic moieties on a polymer side chain or at the polymer terminals; allowing the suspension of pigment particles to contact said polymer at a temperature above the softening point of the polymer, and allowing the resultant suspension to cool to a temperature below the solidification temperature for the polymer while maintaining the pigment particles in suspension.

2. The method of claim 1 wherein the polymer is a copolymer of ethylene and acrylic acid.

3. The method of claim 2 wherein the copolymer is present in sodium salt form.

4. The method of claim 1 wherein the temperature at which the pigments contact the polymer is from about 50° C. to about 100° C.

5. The method of claim 1 wherein the polymer is present in an amount from about 1 to about 10 percent, based on the weight of pigment.

6. The method of claim 1 wherein the size of the pigment particles, prior to coating is from about 0.04 μm to about 5 μm.

7. The method of claim 1 wherein the polymer is a copolymer of ethylene and acrylic acid in sodium salt form, the temperature at which the pigment particles contact the copolymer is from about 50° C. to about 100° C., and the amount of copolymer is from about 1 to about 10 percent, based on the weight of pigment.

8. A coated pigment particle made by the method of claim 1.

9. A method for making double-coated pigment particles having an intermediate hydrophobic polymer coating, said method comprising forming a suspension of the desired pigment particles having a first hydrophobic polymer coating in an aqueous medium that also comprises a second polymer characterized by having hydrophobic moieties on the polymer backbone and ionic moieties on a polymer side chain or at the polymer terminals; allowing the suspension of pigment particles to contact said second polymer at a temperature above the softening point of the second polymer, and allowing the resultant suspension to cool to a temperature below the solidification temperature for the second polymer while maintaining the pigment particles in suspension.

10. The method of claim 9 wherein the hydrophobic polymer is oxidized polyethylene.

11. A method for making coated pigment particles, said method comprising forming a suspension of the desired pigment particles in an aqueous medium that also comprises a polymer characterized by having hydrophobic moieties on the polymer backbone and ionizable moieties on a polymer side chain or at the polymer terminals; allowing the suspension of pigment particles to contact said polymer at a temperature above the softening point of the polymer, and allowing the resultant suspension to cool to a temperature below the solidification temperature for the polymer while maintaining the pigment particles in suspension; and ionizing the ionizable moieties to form ionic moieties on the surface of the pigment particles.

12. The method of claim 11 wherein the polymer is a copolymer of ethylene and acrylic acid.

13. The method of claim 12 wherein the ionizable moieties are ionized with sodium hydroxide.

14. The method of claim 11 wherein the temperature at which the pigments contact the polymer is from about 50° C. to about 100° C.

15. The method of claim 11 wherein the polymer is present in an amount from about 1 to about 10 percent, based on the weight of pigment.

16. The method of claim 11 wherein the size of the pigment particles, prior to coating is from about 0.04 μm to about 5 μm.

17. The method of claim 11 wherein the polymer is a copolymer of ethylene and acrylic acid, the temperature at which the pigment particles contact the copolymer is from about 50° C. to about 100° C., and the amount of copolymer is from about 1 to about 10 percent, based on the weight of pigment.

18. A coated pigment particle made by the method of claim 11.

19. A method for making double-coated pigment particles having an intermediate hydrophobic polymer coating, said method comprising forming a suspension of the desired pigment particles having a first hydrophobic polymer coating in an aqueous medium that also comprises a second polymer characterized by having hydrophobic moieties on the polymer backbone and ionizable moieties on a polymer side chain or at the polymer terminals; allowing the suspension of pigment particles to contact said second polymer at a temperature above the softening point of the second polymer, and allowing the resultant suspension to cool to a temperature below the solidification temperature for the second polymer while maintaining the pigment particles in suspension; and ionizing the ionizable moieties to form ionic moieties on the surface of the pigment particles.

20. The method of claim 19 wherein the hydrophobic polymer is oxidized polyethylene.

* * * * *